United States Patent [19]

Hankawa et al.

[11] Patent Number: 5,727,239
[45] Date of Patent: Mar. 10, 1998

[54] PHOTOGRAPHING OPTICAL APPARATUS

[75] Inventors: Masashi Hankawa, Koza-gun; Masaki Imaizumi, Urawa; Yuji Ogasawara, Hachioji, all of Japan

[73] Assignee: Olympus Optical Co., Ltd., Tokyo, Japan

[21] Appl. No.: 607,774

[22] Filed: Feb. 27, 1996

[30] Foreign Application Priority Data

Feb. 28, 1995 [JP] Japan ................... 7-040409

[51] Int. Cl.$^6$ .................. G03B 41/00; G03B 35/00
[52] U.S. Cl. .................. 396/111; 396/322; 396/324; 396/333; 348/49
[58] Field of Search .................. 354/115, 117; 396/89, 111, 112, 114, 116, 117, 322, 323, 324, 326, 331, 333, 336; 348/46, 49, 343

[56] References Cited

U.S. PATENT DOCUMENTS

| | | | |
|---|---|---|---|
| 862,354 | 8/1907 | Stevens | 354/117 |
| 1,479,211 | 1/1924 | Ames, Jr. et al | 359/726 |
| 1,532,236 | 4/1925 | Douglass | 359/640 |
| 2,413,808 | 1/1947 | Williams | 354/123 |
| 2,709,401 | 5/1955 | Jaros | 354/115 |
| 3,591,269 | 7/1971 | Watson et al. | 352/69 |
| 3,990,087 | 11/1976 | Marks et al. | 354/117 |
| 4,413,891 | 11/1983 | Rybicki | 351/235 |
| 4,437,745 | 3/1984 | Hajnal | 354/117 |
| 4,523,226 | 6/1985 | Lipton et al. | 358/88 |
| 5,153,778 | 10/1992 | Sasian-Alvarado | 359/742 |
| 5,184,223 | 2/1993 | Mihara | 358/209 |
| 5,386,321 | 1/1995 | Kawamura | 359/692 |
| 5,515,122 | 5/1996 | Morishima et al. | 353/98 |
| 5,581,314 | 12/1996 | Yoneyama et al. | 396/331 |

FOREIGN PATENT DOCUMENTS

| | | |
|---|---|---|
| 55-84630 | 6/1980 | Japan . |
| 1-279235 | 11/1989 | Japan . |
| 5-336548 | 12/1993 | Japan . |

*Primary Examiner*—Safet Metjahic
*Assistant Examiner*—Christopher E. Mahoney
*Attorney, Agent, or Firm*—Cushman, Darby & Cushman IP Group of Pillsbury Madison & Sutro LLP

[57] ABSTRACT

A photographing optical apparatus includes reflecting members for reflecting images transmitted along a plurality of optical paths having parallax; optical systems arranged on the plurality of optical paths behind the reflecting members; optical members for reducing vertically the images passing through the optical systems; and an image sensor disposed at or near the imaging plane of the images so that the images reduced by the optical members are formed on the image sensor. By moving the reflecting members, a convergent angle is changed and stereoscopic photography and panoramic photography become possible.

19 Claims, 2 Drawing Sheets

PHOTOGRAPHING OPTICAL APPARATUS

BACKGROUND OF THE INVENTION

1. Field of the Invention

This invention relates to a photographing optical apparatus which is used to photograph a plurality of images at the same time.

2. Description of Related Art

In the past, video cameras which are capable of readily photographing images have been widely utilized for home use as well as for business use. Conventional video camera devices, however, are designed so that the video camera has only one optical path for one image sensor. Thus, in order to photograph a plurality of images at the same time, such a video camera device must use a plurality of video cameras, as set forth in Japanese Patent Preliminary Publication No. Hei 5-336548, or requires a plurality of image sensors for one video camera. In this way, the conventional video camera devices are cumbersome and involve considerable cost. Further, video camera systems such as those disclosed in Japanese Patent Preliminary Publication No. Hei 1-279235 and Japanese Utility Model Preliminary Publication No. Sho 55-84630 are available in which a plurality of images are formed on one image sensor after the images are reduced in size. In such video camera systems, since the images are reduced not only in a vertical direction but also in a lateral direction, a horizontal resolution to which a human eye is sensitive will be sacrificed. Moreover, a plurality of images are arranged in a lateral direction on an image sensor, and thus when the signals of the images are read out, the changeover from one image to another is required at least once per horizontal scanning line of the image sensor. Thus, there are defects that the images are hard to see and the changeover control of the images becomes complicated. Further, other video camera systems in which a plurality of images are time-divided and formed in succession on an image sensor will produce the flicker of the images.

SUMMARY OF THE INVENTION

It is, therefore, an object of the present invention to provide a photographing optical apparatus which facilitates stereoscopic photography and panoramic photography, with neither a plurality of video cameras nor a plurality of image sensors for a camera, but which is free from degradation of the horizontal resolution, and from frequent alteration between the images during scanning of the image sensor.

In order to accomplish this object, the photographing optical apparatus of the present invention is constructed so that images transmitted along a plurality of optical paths are vertically reduced in size and the reduced images are arranged in a vertical direction on an image sensor. According to the present invention, therefore, the images need not be reduced laterally and the horizontal resolution is not sacrificed. Furthermore, a plurality of images are made to fall on a single image sensor at the same time. Hence, compared with the technique of time division that a plurality of images are made to fall on a single image sensor in succession, the present invention excels in the fact that the images do not flicker and a continuous motion of an object can be smoothly reproduced. Since the same image is principally obtained from end to end of one horizontal scanning line of the image sensor, it is not necessary to switch over one image to another on one horizontal scanning line as in the case where a plurality of images are laterally arranged on the image sensor. Also, where cylindrical lenses are used to reduce the images, the surfaces of the images will be distorted if the lenses have powers. It is therefore desirable that the cylindrical lenses are powerless.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the drawings, the present invention will be explained in detail below.

Figure 1:
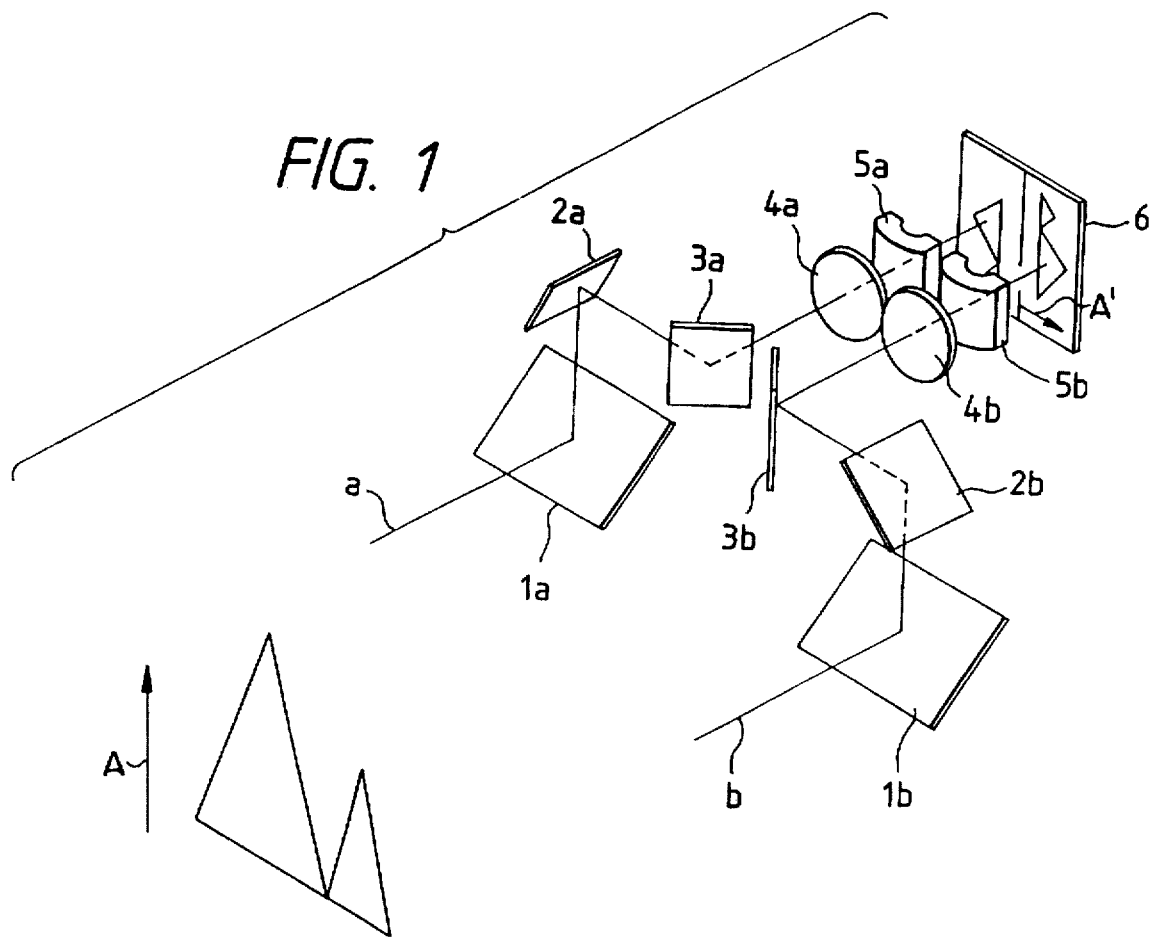
FIG. 1 is a schematic view showing the arrangement of a first embodiment of the photographing optical apparatus according to the present invention.

FIG. 1 shows an optical arrangement of the first embodiment in the present invention. This embodiment includes mirrors 1a and 1b, 2a and 2b, and 3a and 3b; lens systems 4a and 4b; and powerless cylindrical lenses 5a and 5b, which are all arranged in optical paths a and b in which parallax is provided or images are laterally placed to secure a wide field of view; and an image sensor 6 situated at or near the imaging plane of the images transmitted along the optical paths a and b. Also, as the image sensor 6, a photoelectric converting element, such as a CCD, is used. Each of the powerless cylindrical lenses 5a and 5b may be an optical system made powerless by a combination of positive and negative cylindrical lenses, or may also be a cylindrical lens which becomes powerless with a single lens, such as that shown in FIG. 1. The mirrors 1a and 1b, 2a and 2b, and 3a and 3b are connected to motors, not shown in the figure, by which these mirrors are moved so that a convergent angle, namely an imaging range, can be changed. According to the first embodiment, the images transmitted along the optical paths a and b are reflected by the mirrors 1a and 1b, 2a and 2b, and 3a and 3b to rotate by 90°, and by passing through the lens systems 4a and 4b, are further rotated 90°. The images are thus formed on the image sensor 6, and at the same time, are reduced in a vertical direction by the powerless cylindrical lenses 5a and 5b (compare A to A' in FIG. 1). Also, the motors are operated to change the positions of the mirrors 1a and 1b, 2a and 2b, and 3a and 3b, and thereby the imaging ranges of the optical paths can be varied. Thus, the apparatus of the first embodiment is applicable to stereoscopic photography and panoramic photography.

Figure 2:
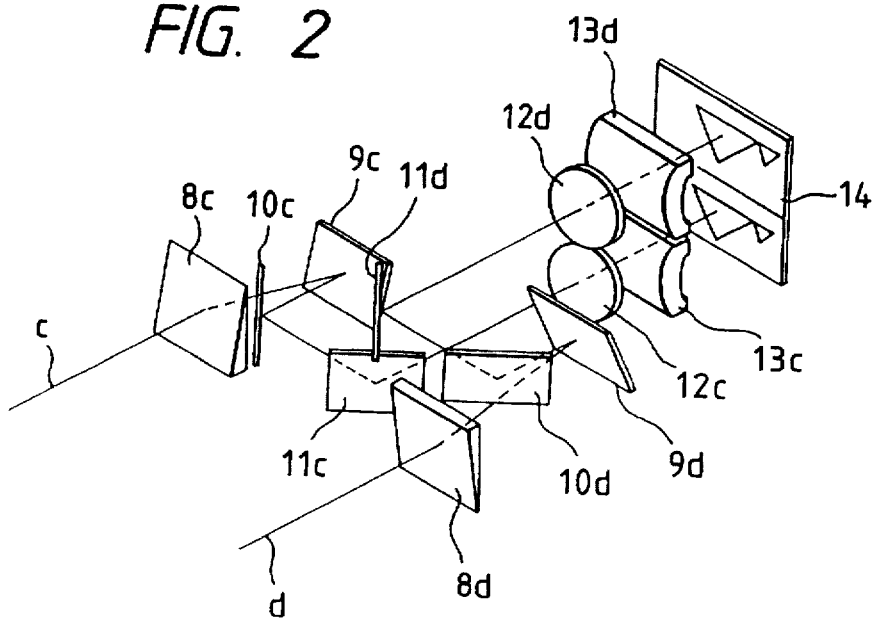
FIG. 2 is a schematic view showing the arrangement of a second embodiment of the photographing optical apparatus according to the present invention.

FIG. 2 shows an optical arrangement of the second embodiment in the present invention. This embodiment includes wedge-shaped prisms 8c and 8d; mirrors 9c and 9d, 10c and 10d, and 11c and 11d; lens systems 12c and 12d; and powerless cylindrical lenses 13c and 13d, which are all arranged in optical paths c and d in which parallax or images to be arranged vertically for a wide field of view; in totality and an image sensor 14 situated at or near the imaging plane of the images transmitted along the optical paths c and d. Also, as the image sensor 14, a photoelectric converting element, such as a CCD, is used. Each of the powerless cylindrical lenses 13c and 13d may be an optical system made powerless by a combination of positive and negative cylindrical lenses, or may also be a single cylindrical lens which is made powerless in itself such as that shown in FIG. 2. The wedge-shaped prisms 8c and 8d and the mirrors 9c and 9d, and 10c and 10d are connected to motors, not shown in the figure, by which these prisms and mirrors are moved so that a convergent angle, namely direction of view, can be changed. According to the second embodiment, the bundles of rays along the optical paths c and d laterally arranged are turned downward and upward by the wedge-shaped prisms 8c and 8d, respectively, and are then arranged vertically by the mirrors 9c and 9d, and 10c and 10d. Subsequently, the images, when formed on the image sensor 14 by the lens systems 12c and 12d, are reduced in an image height direction by the powerless cylindrical lenses 13c and 13d arranged between them. Also, the motors are operated to change the positions of the wedge-shaped prisms 8c and 8d and the mirrors 9c and 9d, and 10c and 10d, and thereby the direction of view determined by the optical paths can be varied. Thus, the apparatus of the second embodiment is applicable to stereoscopic photography and panoramic photography.

Figure 3:
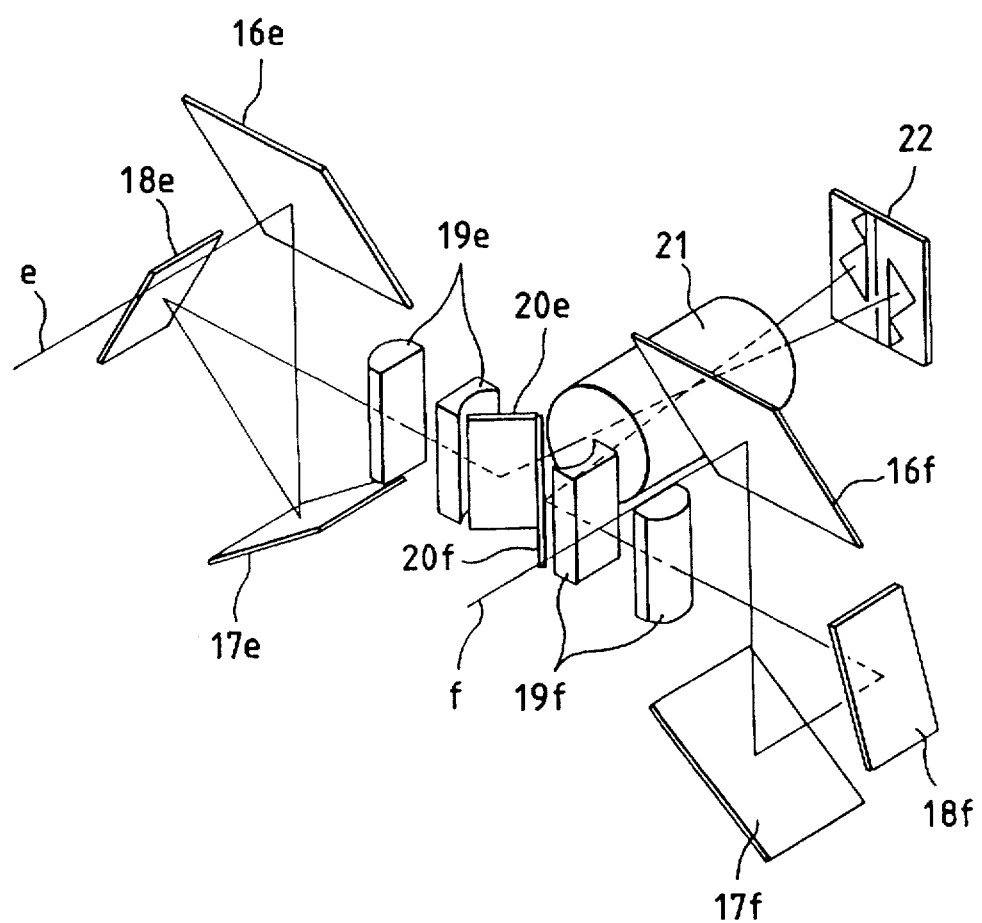
FIG. 3 is a schematic view showing the arrangement of a third embodiment of the photographing optical apparatus according to the present invention.

FIG. 3 shows an optical arrangement of the third embodiment in the present invention. This embodiment includes mirrors 16e and 16f, 17e and 17f, 18e and 18f, and 20e and 20f; cylindrical lens units 19e and 19f made powerless as a whole, located so that parts of optical paths e and f cross, the mirrors and cylindrical lens unit 16e-20e and the mirrors and cylindrical lens unit 16f-20f being arranged in the optical paths e and f respectively, whereby provided are images involving parallax or images to be arranged side by side for a wide field of view in totality; a lens system 21 placed at the position where the parts of the optical paths e and f cross; and an image sensor 22 situated at or near the imaging plane of the images transmitted along the optical paths e and f. Also, as the image sensor 22, a photoelectric converting element, such as a CCD, is used. Each of the powerless cylindrical lens units 19e and 19f may be an optical system made powerless by a combination of positive and negative cylindrical lenses, such as that shown in FIG. 3, or may also be a single cylindrical lens which is made becomes powerless in itself. The mirrors 16e and 16f, 17e and 17f, 18e and 18f, and 20e and 20f and the powerless cylindrical lens units 19e and 19f are connected to motors, not shown in the figure, by which these mirrors and lens units are moved so that a convergent angle, namely directions of view, can be changed. According to the third embodiment, the bundles of rays along the optical paths e and f are reflected by the mirrors 16e and 16f, 17e and 17f, 18e and 18f, and 20e and 20f to rotate by 90° and are narrowed by the powerless cylindrical lens units 19e and 19f in a direction such that images to be formed thereafter are reduced in an image height direction. Subsequently, the images are formed by the single common lens system 21 on the image sensor 22 as turned by 90°. Also, the motors are operated to change the positions of the mirrors 16e and 16f, 17e and 17f, 18e and 18f, and 20e and 20f and the powerless cylindrical lens units 19e and 19f and thereby the direction of view determined by the optical paths can be varied. Thus, the apparatus of the third embodiment is applicable to stereoscopic photography and panoramic photography.

What is claimed is:

1. A photographing optical apparatus comprising:

reflecting means for reflecting a plurality of images transmitted along a plurality of optical paths having parallax;

optical means arranged on said plurality of optical paths on an image side of said reflecting means for forming said pluarity of images;

image reducing means for reducing the plurality images only in a vertical direction; and an image sensor disposed substantially at an imaging plane of the images so that the images reduced by said image reducing means are formed thereon.

2. A photographing optical apparatus according to claim 1, wherein said reflecting means is movably arranged to allow a change of a convergent angle of said plurality of images.

3. A photographing optical apparatus according to claim 2, wherein said image reducing means includes powerless cylindrical lenses.

4. A photographing optical apparatus according to claim 3, wherein said optical means is disposed at a position where said plurality of optical paths are crossed by said reflecting means, behind said image reducing means, and said image reducing means is movably arranged to allow the change of the convergent angle of said plurality of images.

5. A photographing optical apparatus according to claim 1, wherein at least three reflecting surfaces for each of said plurality of optical paths are included in said reflecting means, said at least three reflecting surfaces being arranged such that the plurality of images are aligned in the vertical direction on said image sensor.

6. A photographing optical apparatus according to claim 5, wherein said image sensor has horizontal scanning lines and is positioned such that said horizontal scanning lines are perpendicular to the vertical direction in which said plurality of images are aligned, thereby each of said scanning lines crosses only one image among the plurality of images formed on said image sensor.

7. A photographing optical apparatus according to claim 1, wherein said image reducing means is arranged to said image side of said optical means.

8. A photographing optical apparatus comprising:

reflecting means for reflecting bundles of rays transmitted along a plurality of optical paths, the optical paths being arranged in a lateral direction on incident sides thereof;

imaging optical means arranged on said plurality of optical paths on an image side of said reflecting means for forming a plurality of images;

one-directional image reducing means for reducing the images which are to be formed by said imaging optical means, said image reducing means being arranged in such a relation with said reflecting means that a ratio of an image height to an image width of the images is smaller than a ratio of an object height to an object width of corresponding objects, the object height being determined perpendicular to said lateral direction; and an image sensor disposed substantially at an imaging plane of the images so that the images reduced by said image reducing means are formed thereon.

9. A photographing optical apparatus according to claim 8, wherein said reflecting means is movably arranged to allow a change of a convergent angle of said plurality of images.

10. A photographing optical apparatus according to claim 9, wherein said image reducing means includes powerless cylindrical lenses.

11. A photographing optical apparatus according to claim 10, wherein said imaging optical means is located at a position where said plurality of optical paths are crossed by said reflecting means, behind said image reducing means, and said image reducing means is movably arranged to allow the change of the convergent angle.

12. A photographing optical apparatus according to claim 8, wherein at least three reflecting surfaces for each of said plurality of optical paths are included in said reflecting means, said at least three reflecting surfaces being arranged such that said plurality of images are aligned in a direction of the image height.

13. A photographing optical apparatus according to claim 12, wherein said image sensor has horizontal scanning lines and is positioned such that said horizontal scanning lines are perpendicular to the direction of the image height, thereby each of said scanning lines crosses only one image among the plurality of images formed on said image sensor.

14. A photographing optical apparatus according to claim 8, wherein said image reducing means is arranged to said image side of said imaging optical means.

15. A photographing optical apparatus comprising:

a plurality of optical paths having parallax;

a plurality of reflecting surfaces disposed along said optical paths which reflect a plurality of images transmitted along said optical paths;

a plurality of image reducing optical elements disposed along said plurality of optical paths which reduce said plurality of images only in a vertical direction; and an image sensor disposed substantially at an imaging plane of said plurality of images such that images reduced by said image reducing optical elements are formed thereon.

16. A photographing optical apparatus according to claim 15, wherein said plurality of reflecting surfaces are movably arranged to allow a change of a convergent angle of said plurality of images.

17. A photographing optical apparatus according to claim 16, wherein said plurality of image reducing optical elements include cylindrical lenses.

18. A photographing optical apparatus according to claim 15, wherein said plurality of reflecting surfaces includes at least three reflecting surfaces for each of said plurality of optical paths.

19. A photographing optical apparatus according to claim 18, wherein said image sensor has horizontal scanning lines and is positioned such that said horizontal scanning lines are perpendicular to the vertical direction in which said plurality of images are aligned, thereby each of said scanning lines crosses only one image among the plurality of images formed on said image sensor.

* * * * *